United States Patent [19]
Pehkonen

[11] Patent Number: 6,038,695
[45] Date of Patent: Mar. 14, 2000

[54] DATA TRANSMISSION METHOD AND EQUIPMENT FOR ENCODING A SIGNAL

[75] Inventor: Kari Pehkonen, Oulu, Finland

[73] Assignee: Nokia Mobile Phones, Ltd., Salo, Finland

[21] Appl. No.: 08/780,352

[22] Filed: Jan. 8, 1997

[30] Foreign Application Priority Data

Jan. 12, 1996 [FI] Finland ..................................... 960161

[51] Int. Cl.$^7$ .................................................. G06F 11/10
[52] U.S. Cl. ............................................................ 714/786
[58] Field of Search ................................ 371/43.1, 43.5, 371/37.4, 30; 714/786, 793, 755, 746

[56] References Cited

U.S. PATENT DOCUMENTS

| | | | |
|---|---|---|---|
| 3,795,864 | 3/1974 | Fulton, Jr. .............................. | 325/38 R |
| 5,159,608 | 10/1992 | Falconer et al. ........................... | 375/1 |
| 5,170,396 | 12/1992 | Rivers et al. ............................... | 371/6 |
| 5,193,094 | 3/1993 | Viterbi ...................................... | 371/43 |
| 5,239,560 | 8/1993 | Daniel ..................................... | 375/38 |
| 5,327,439 | 7/1994 | Estola et al. ............................... | 371/43 |
| 5,396,653 | 3/1995 | Kivari et al. ............................... | 455/88 |
| 5,430,740 | 7/1995 | Kivari et al. ............................. | 371/37.1 |
| 5,721,745 | 2/1998 | Hladik et al. .............................. | 371/43 |

OTHER PUBLICATIONS

From Pioneers to the 21$^{st}$ Century, vol. 1, May '92, Ling and Falconer, "Combined Orthogonal/Convolutional Coding For A Digital Cellular CDMA System" pp. 63–66.

IEEE Journal on Selected Areas in Communications, vol. 8, May '90, Viterbi, "Very Low Rate Convolutional Codes for Maximum Theoretical Performance of Spread–Spectrum Multiple–Access Channels" pp. 641–649.

Proceedings of the International Conference on Communications, vol. 1, May '93, Berrou C. et al., "Near Shannon Limit Error–Correcting Coding and Decoding: Turbo–Codes", pp. 1064–1070.

"Very Low Rate Convolutional Codes for Maximum Theoretical Performance of Spread–Spectrum Multiple–Access Channels", Viterbi, IEEE Jnl. on Selected Areas in Communications, vol. 8, No. 4, May 1990, pp. 641–649.

Near Shannon limit error–correcting coding and decoding: Turbo–codes, Berrou, C., Glavieux, A., Thitimajshima, P., IEEE Intl. Conf. On Communications, ICC' 93 Geneva, Switzerland May 23–26, 1993, vol. 2, pp. 1064–1070.

*Primary Examiner*—Phung M. Chung
*Attorney, Agent, or Firm*—Perman & Green, LLP

[57] ABSTRACT

The invention relates to a data transmission method and equipment for encoding and decoding a signal, comprising on the encoding side at least two parallel encoders (600, 602) and on the decoding side at least two parallel decoders (700, 702). In order to provide efficient coding, on the encoding side of the equipment each parallel encoder (600, 602) comprises a number of registers (612a–618a) connected in tandem, and a number or adding means (622a–626a) that add the outputs of the registers (612a–618a) to the data, and a mapping means (628a) the input of which consists of the outputs of the registers (612a–618a) and the output (608) of which comprises a Walsh symbol selected on the basis of inputs of a converter means (628a), and on the decoding side of the equipment the input (704, 706) of each parallel decoder (700, 702) is the received Walsh symbol and the reliability information (718, 720) about the symbol decision, received from the other parallel decoders.

12 Claims, 5 Drawing Sheets

$$H_8 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

FIG. 5A $$\bar{H}_8 = \begin{bmatrix} -1 & -1 & -1 & -1 & -1 & -1 & -1 & -1 \\ -1 & 1 & -1 & 1 & -1 & 1 & -1 & 1 \\ -1 & -1 & 1 & 1 & -1 & -1 & 1 & 1 \\ -1 & 1 & 1 & -1 & -1 & 1 & 1 & -1 \\ -1 & -1 & -1 & -1 & 1 & 1 & 1 & 1 \\ -1 & 1 & -1 & 1 & 1 & -1 & 1 & -1 \\ -1 & -1 & 1 & 1 & 1 & 1 & -1 & -1 \\ -1 & 1 & 1 & -1 & 1 & -1 & -1 & 1 \end{bmatrix}$$

FIG. 5B

DATA TRANSMISSION METHOD AND EQUIPMENT FOR ENCODING A SIGNAL

FIELD OF THE INVENTION

The invention relates to a data transmission method for transmitting a digital signal, comprising processing the signal to be transmitted in order to minimize transmission errors produced in the channel.

BACKGROUND OF THE INVENTION

In data links, the transmission path used for transmitting signals is known to cause interference on telecommunication. This occurs regardless of the physical form of the transmission path, i.e. whether the path is a radio link, an optical fibre or a copper cable.

In order to diminish the effects of interference caused by the transmission path, a digital signal is encoded so that the connection could be made more reliable. In such a case, the errors caused by the interference in the signal to be transmitted can be detected and also corrected without retransmission, depending on the encoding method used.

Conventional coding methods used in digital telecommunication include for example block coding and convolutional coding. In block coding, the bits to be encoded are grouped into blocks and parity bits are added at the end of the blocks so that the correctness of the bits in the preceding block can be checked by means of the parity bits. In convolutional coding, the parity bits are placed among the data bits so that the encoding is continuous. The data bits are not grouped into blocks nor are the parity bits connected to the immediately preceding data bits, but they are distributed over the area of a bit group of a certain length, this bit number being called the constraint length of the convolutional code. Convolutional encoders and decoders are implemented in manners known in the field. An encoder can be realized for example with shift registers.

"Very Low Rate Convolutional Codes for Maximum Theoretical Performance of Spread-Spectrum Multiple-Access Channels", Viterbi, *IEEE Journal on Selected Areas in Communications*, Vol. 8, No. 4, May 1990, pp. 641-649, discloses a method which combines convolutional coding and multiple-level orthogonal modulation. In this method, encoding takes place in principle as shown in FIG. 1. The encoder shown in the figure consists of a k-bit convolutional encoder that is realized with a shift register 100 and that outputs m code bits 106 which control an orthogonal modulator 102 the output of which produces one of $M=2^m$ possible orthogonal symbols, which is shown with M parallel bits. This M-level orthogonal signal group may be for example an M-level Walsh signal group. FIG. 2 shows a decoder realizing the method according to the aforementioned reference and comprising an M-level demodulator 200, for example a group of correlators or a Walsh-Hadamard conversion circuit, the output of which consists of M correlation values 204 that are supplied to a Viterbi decoder 202.

U.S. Pat. No. 5,193,094 discloses a method similar to the previous method, wherein the first and the last one of the bits in the output of a shift register are taken and connected to an XOR gate the output of which is supplied with the output of an orthogonal modulator to another XOR gate the output of which is the symbol to be transmitted.

*Near Shannon limit error-correcting coding and decoding: Turbo-codes* by Berrou, C., Glavieux, A., Thitimajshima, P., IEEE International Conf. on Communications, ICC'93, Geneva, Switzerland 23–26 May, 1993, Vol. 2, pp. 1064–1070, which is incorporated herein by reference, describes the principle of parallel concatenated convolutional coding. These codes are often called turbo-codes. The capacity of turbo-codes in an AWGN channel is excellent. The encoding takes place with two or more parallel encoders, and the signals input to the encoders are interleaved in order to produce an independent data flow.

The drawback of the known methods is that they require the received signal to have a higher signal-to-noise ratio than the novel arrangement according to the invention in order to achieve the desired quality of transmission.

SUMMARY OF THE INVENTION

The object of the present invention is to provide an encoding method which has better properties than previously and which makes it possible to improve the capacity and performance of data transmission systems, especially CDMA systems.

This is achieved with a method of the type described in the preamble, wherein the method further comprises the step of realizing the signal coding by using combined parallel concatenated convolutional coding and a superorthogonal convolutional code.

The invention also relates to equipment for encoding and decoding a digital signal, the equipment comprising on the encoding side at least two parallel encoders the input of which is the data sequence to be transmitted, and which data sequence is interleaved in such a way that the data is in a different order in each encoder, and on the decoding side at least two parallel decoders, on the encoding side each parallel encoder comprising a group of registers which are combined with a cascade connection and to which the data to be encoded is supplied, and a group of adding means the connections of which depend on the generator polynomial given, and which add the outputs of the registers to the data to be encoded, and a mapping means the input of which consists of the outputs of the registers, and the output of which mapping means comprises a Walsh symbol or a complement thereof selected on the basis of inputs of a converter means, and on the decoding side the input of each parallel decoder consisting of the received Walsh symbol or a complement thereof and the reliability information about the symbol decision, received from the other parallel decoders.

The method according to the invention provides a considerable capacity compared to the prior encoding methods. In the method according to the invention, the encoding is carried out recursively and the decoding is performed iteratively, and the degree of complexity of the implementation depends on the number of iteration rounds to be carried out.

In the arrangement according to the invention, it is possible to use a very low code rate (1/N, N>>1). The method according to the invention is particularly advantageous in CDMA systems where several users transmit on the same frequency channel that is manifold compared to the bit rate used.

DESCRIPTION OF THE FIGURES

In the following, the invention will be described in greater detail with reference to the examples according to the accompanying drawings, in which FIGS. 5a and 5b show Hadamard matrices.

DESCRIPTION OF THE PREFERRED EMBODIMENTS

In the arrangement according to the invention, the channel coding of a signal is implemented by using combined parallel concatenated convolutional coding and a superorthogonal convolutional code. In the following, the arrangement according to the invention will be examined by first describing the principles of parallel concatenated convolutional coding and then the combined encoding according to the invention.

Figure 1:
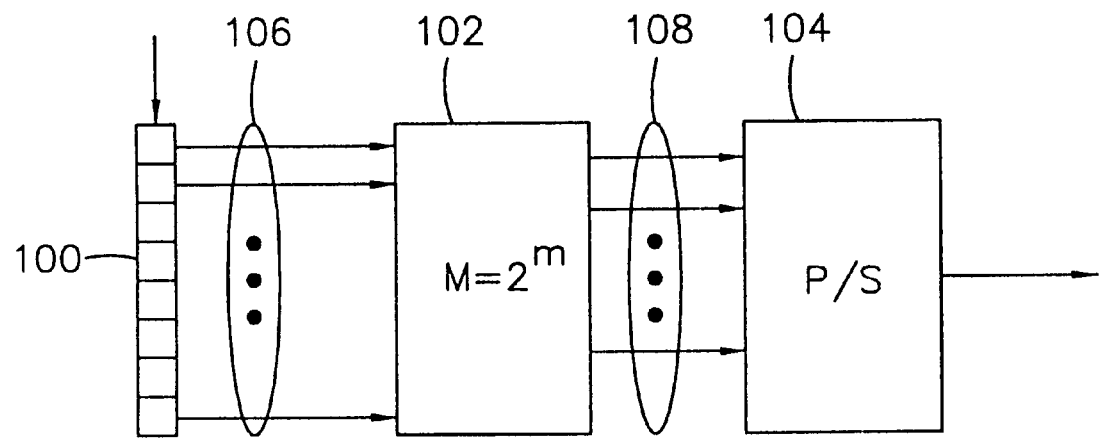
FIGS. 1 and 2 show the prior art encoder and decoder described above.
Figure 2:
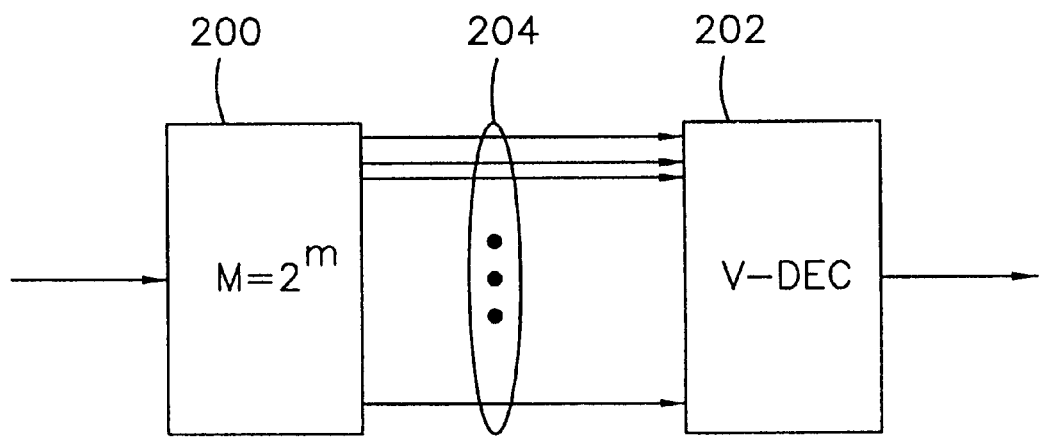
Figure 3:
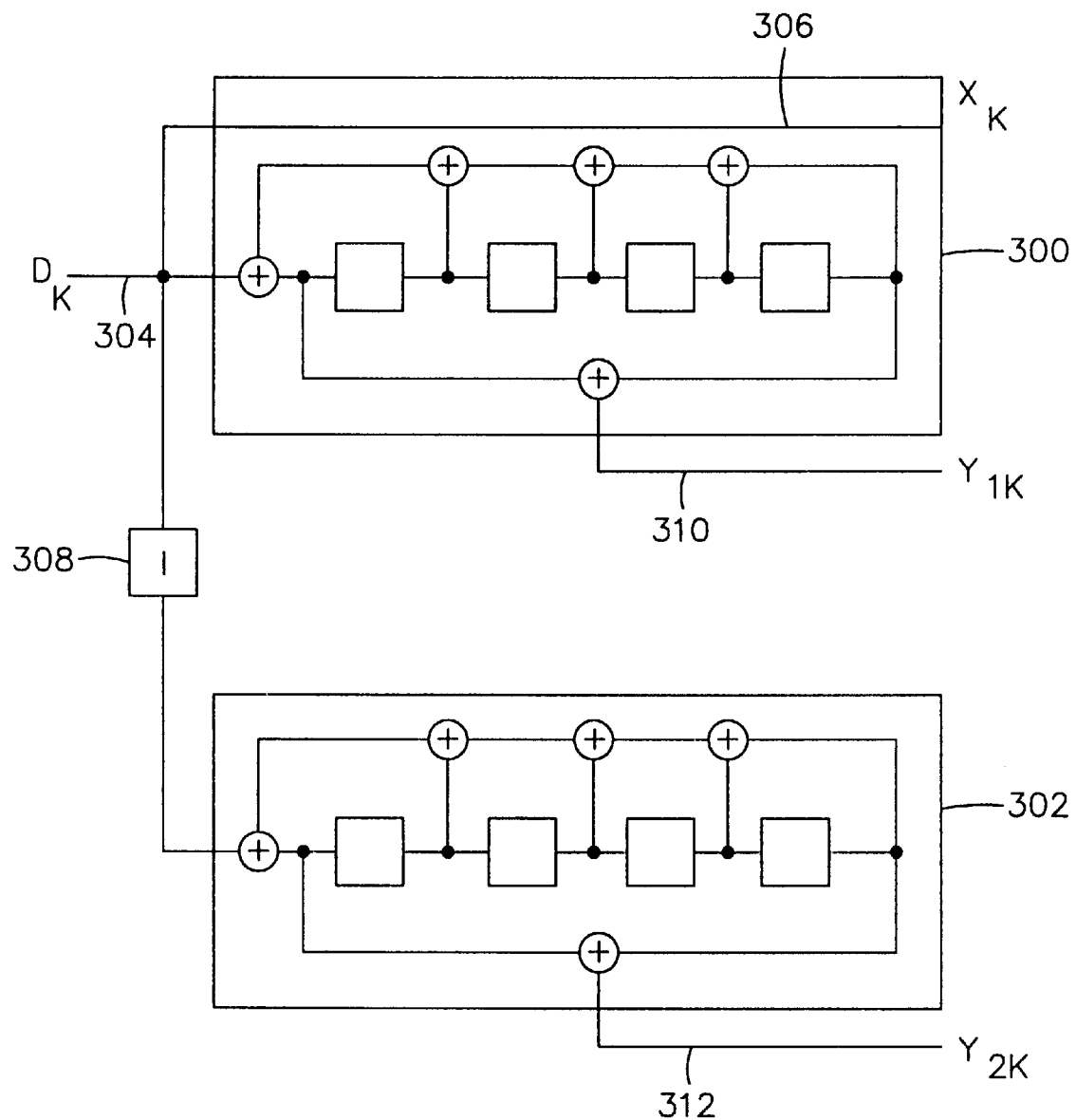
FIG. 3 shows the structure of an encoder using a turbo-code.

Examine turbo-coding by means of the code structure shown in FIG. 3. The encoder for a turbo-code consists of two or more concatenated convolutional encoders 300, 302 that operate in parallel. FIG. 3 shows, by way of example, two parallel encoders that have generator polynomials $g_1=37$ and $g_2=21$ (octal). The first encoder 300 processes directly the data bit sequence $D=(d_0, d_1, \ldots, d_{N-1})$ input on line 304 to be transmitted. The output of the encoder comprises both the mere data information $x_k$ on line 306 and the recursively encoded redundant information $Y_{1k}$ on line 310. The code is therefore systematic. The data information is interleaved at 308 to produce an independent data flow before it is supplied to the second encoder 302 the output of which comprises recursively calculated redundant information $Y_{2k}$ on line 312.

Examine next superorthogonal coding. Super-orthogonal coding as such is previously known and it is described in greater detail for example in *CDMA: Principles of spread spectrum communication* by Viterbi, A., Addison-Wesley Publishing Company, 1995, pp. 155–166. Examine first an example by means of FIG. 4a. The figure shows a part of a trellis diagram of a binary convolutional code with the constraint length L=4. State outputs are also shown. Each branch comprises 8 states, and two paths merge at each state and two paths correspondingly leave from each state. If the code used is a ½ rate code, the encoder provides from each state one of the sequences 00, 01, 10 or 11 as output. Since there are 8 states and 16 paths, the same sequences must be used often.

The code rate can be decreased by using long sequences in such a way that all the output sequences are mutually orthogonal, i.e. the correlation between the sequences is zero. It is possible to use here for example rows of Hadamard matrix $H_{16}$. There are altogether 16 transitions from one state to another. Therefore it is possible to set one row of the Hadamard matrix $H_{16}$ for one transition. In such a case, all the inputs and outputs of the states are orthogonal, which increases the bandwidth. The code rate is in this case $\frac{1}{16}$.

The above-described code can be further improved by using Hadamard matrix $H_8$ that is supplemented with sequences that are obtained by multiplying the matrix $H_8$ with $-1$. The matrices are shown in FIGS. 5a and 5b.

A biorthogonal group of 16 sequences is thus obtained. All the sequences are not mutually biorthogonal, however. The result is instead 8 pairs of sequences that are biorthogonal with respect to each other and orthogonal with respect to the other 14 sequences. When the sequences are set in such a way that the paths output from the same state are provided with mutually biorthogonal sequences, it is possible to improve the capacity. The code rate for such a biorthogonal code is ⅛.

Figure 4B:
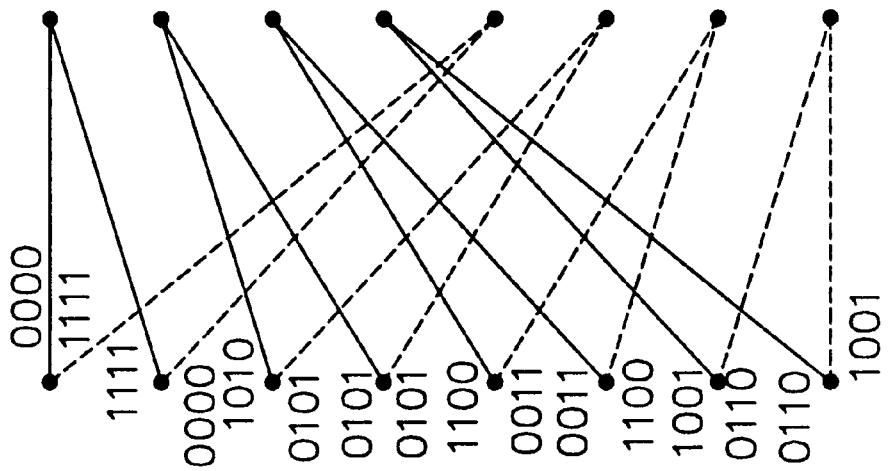
FIGS. 4a and 4b illustrate an example of the trellis of a binary and a superorthogonal code.
Figure 4A:
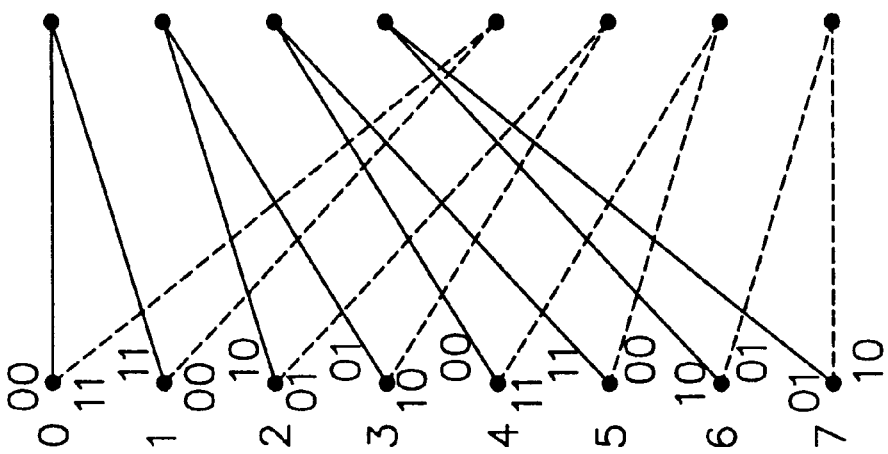

The code can be further improved by setting the sequences in such a way that the outputs of adjacent states have the same biorthogonal sequences. They must be mapped on different paths so that both the incoming and outgoing transitions are biorthogonal. This is illustrated in FIG. 4b. The code rate can then be increased to ¼ since it is possible to use the Hadamard matrix $H_4$ and the complementary matrices thereof which together comprise a sufficient number of sequences. A complementary matrix refers in this connection to a matrix where values '1' are converted to values '-1' and vice versa. A superorthogonal code has thus been produced.

Figure 6:
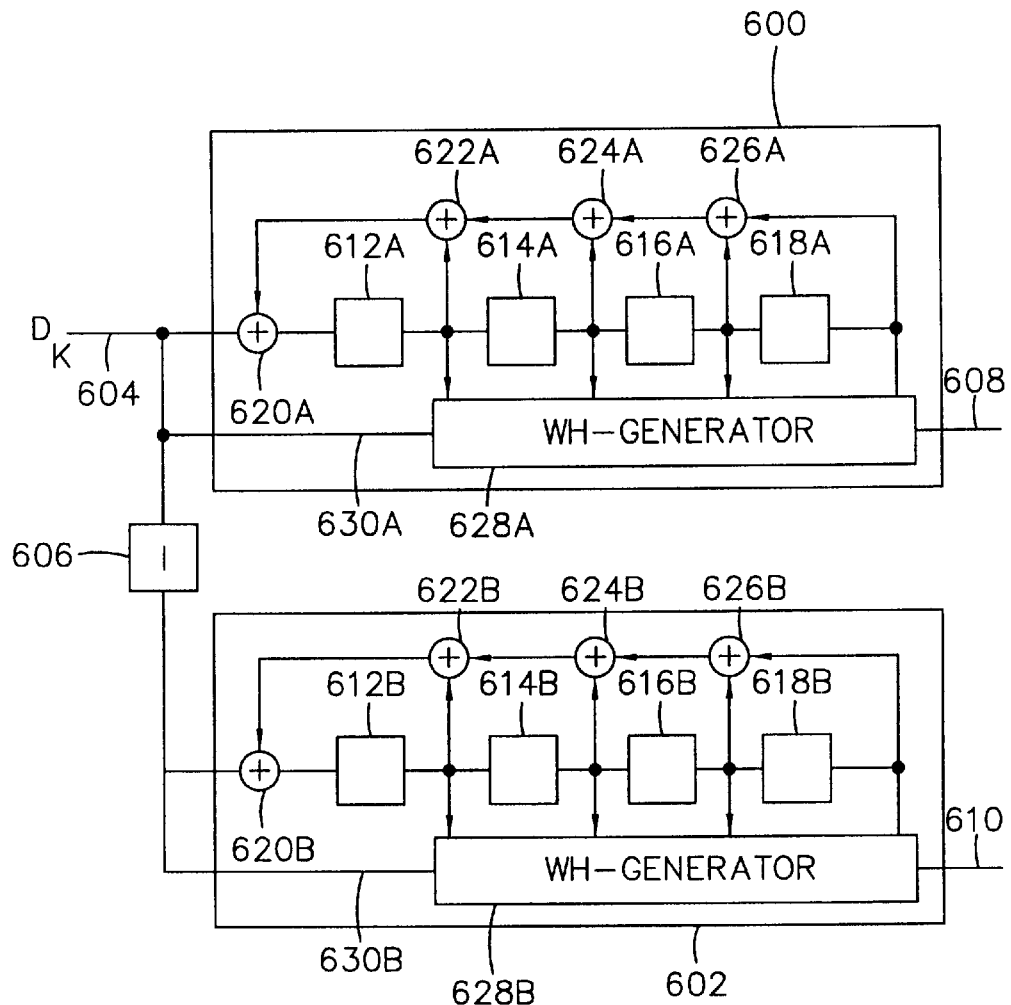
FIG. 6 illustrates an example of the structure of an encoder implementing the method according to the invention.

Examine next the arrangement according to the invention for implementing channel coding by means of the encoder structure shown in FIG. 6. The figure shows a simple manner for providing the encoding according to the invention, but there are naturally also other embodiments, as it is evident for a person skilled in the art.

In the method according to the invention, the data sequence to be transmitted is supplied to two or more parallel encoders two of which are shown in the FIG. 600, 602. Data is supplied to the other encoder 602 in an interleaved form 606. Each encoder comprises a recursive turbo-coder that consists of a number of registers 612a to 618a and 612b to 618b, and connections between the registers, realized by means of adders 622a to 626a, 622b to 626b. The recursiveness is realized by supplying a signal from the output of the registers to the adder 620a, 620b where it is added to the data sequence to be encoded. In the example of the figure, the generator polynomial is 37 (octal) and the constraint length L=5. Each encoder further comprises a mapping means 628a, 628b, for example a Walsh-Hadamard generator that generates the desired row of the Hadamard matrix on the basis of the states of the registers 612a to 618a and 612b to 618b. The obtained sequences, i.e. Walsh symbols and their complements 608, 610, are applied further to other parts of the transmitter to be transmitted to the channel. In the example of the figure, the Hadamard matrix is $H_8$ or a complementary matrix thereof. The generator control can also be implemented in such a way that the registers determine the row of the Hadamard matrix and the data bit 630a, 630b determines the sign of the matrix, i.e. whether one uses the Hadamard matrix directly or the complementary matrix thereof. The data bit can also be taken after the adder 620a or it may be some other output bit of the convolutional encoder. The coding rate of the arrangement according to the invention is $\frac{1}{2}^{L-1}$. The mapping means can be realized in practice for example by means of a memory element or a processor.

Figure 7:
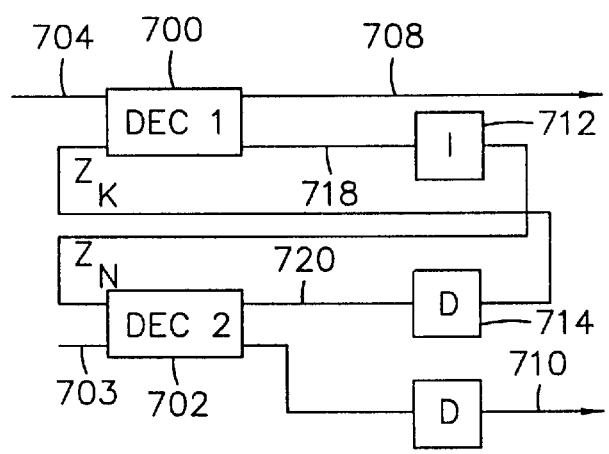
FIG. 7 illustrates an example of the structure of a decoder realizing the method according to the invention.

Examine next the arrangement according to the invention for decoding channel coding by means of the illustrative block diagram of FIG. 7. In the arrangement according to the invention, the decoder comprises two or more parallel decoder blocks two of which are shown in the example of the figure, 700, 702. Each decoder block receives in its input a Walsh symbol or a complement thereof 704, 706 received from the channel. A Walsh symbol refers below either to a symbol or a complement thereof. In the arrangement according to the invention, the decoder produces, in addition to a symbol decision 708, 710, information concerning the reliability of the decision made 718, 720. The reliability information is supplied to the parallel decoder blocks as auxiliary information that they can use in decoding the Walsh symbol. Since the data bits supplied to the different encoder blocks were interleaved for transmission, interleaving 712, 714 must also be performed in the decoder and deinterleaving must be carried out when information is transmitted between the decoder blocks. Correspondingly, deinterleaving is also performed on the outputs of the decoder blocks 702 that had as input the Walsh symbol 706 obtained from the interleaved data.

Examine the decoding starting from the initial situation. The decoder 700 receives the first symbol $W_i$. At this stage, the decoder is not aware of the reliability information of the parallel decoder 702, wherefore the input $Z_k$ has been initialized to a suitable value depending on the decoding algorithm used. The decoder makes a symbol decision and also computes the reliability of the decision. It is possible to use in the decoders known decision algorithms that are described for example in "Optimal decoding of linear codes for minimizing symbol error rate", Bahl, L., Cocke, J., Jelinek, F., Raviv, J., *IEEE Transactions on Information Theory,* March 1974, pp. 284–287. The decoder can be realized for example by means of a signal processor or some other corresponding separate logic. The reliability information 718 is interleaved and supplied to the input of the parallel decoder 702. The parallel decoder processes the received Walsh symbol $W_j$ provided in its input and utilizes the reliability information $Z_n$ it has obtained. The decoder 702 makes the decision and also computes the reliability information. The effect of $Z_n$ is eliminated from the reliability information and it is further transmitted 720 after deinterleaving 714 to the parallel decoder 700 which may further process the first symbol $W_i$ again using the auxiliary information $Z_k$ it has obtained. The decoding can therefore be realized iteratively by repeating it a desired number of times. The symbol decision is obtained, if desired, from the decoder outputs 708, 710.

Even though the invention is described above with reference to the example according to the accompanying drawings, it is clear that the invention is not restricted thereto, but it can be modified in may ways within the scope of the inventive idea disclosed in the appended claims.

I claim:

1. A data transmission method for transmitting a digital signal in a transmission channel, comprising the steps of:
   processing the digital signal to be transmitted by linear coding in order to minimize transmission errors produced in the transmission channel, and
   coding the processed digital signal using combined parallel concatenated convolutional coding and a superorthogonal convolutional code, and
   transmitting the digital signal, after the preceding coding steps, in the transmission channel.

2. A method according to claim 1, wherein information to be transmitted by said digital signal is subjected to parallel concatenated convolutional coding, by a number of parallel convolutional encoders, which produces bits that determine a group of superorthogonal symbols to be transmitted, the number of the symbols per data symbol to be transmitted equalling the number of the parallel convolutional encoders.

3. A method according to claim 1, further comprising the steps of:
   supplying information to be transmitted by said digital signal to two or more parallel encoding blocks such that the information supplied to each encoding block is interleaved in a different order, and
   recursively convolutional coding the information to be transmitted in each encoding block on the basis of predetermined generator polynomials,
   and wherein the output of each encoding block is mapped as a Walsh function or a complementary value thereof for transmission by the digital signal.

4. A method according to claim 3, wherein said output of each encoding block comprises data bits and the original data bit output by an encoding block determines whether a Walsh function or a complement thereof is transmitted.

5. A method according to claim 3, wherein said output of each encoding block comprises bits and a bit in the output of each encoding block determines whether a Walsh function or a complement thereof is transmitted.

6. A method according to claim 5, further comprising the steps of:
   receiving the transmitted digital signal as a received signal,
   iteratively decoding the received signal with two or more parallel decoders which produce, in addition to a decoded bit, information about the reliability of the transmission determination made derived from said linear coding, and
   wherein the information about the reliability of the transmission determination made by a respective parallel decoder during a decoding iteration is supplied to the other parallel decoders.

7. A method according to claim 3, further comprising the steps of:
   receiving the transmitted digital signal as a received signal, supplying the received Walsh functions or the complements thereof of said received signal each to a respective parallel decoder for iterative decoding, p1 interleaving information produced by each decoder about the reliability of the mapping decision made derived from said linear coding and supplying said information to the other parallel decoders, and
   utilizing said information during the next iteration round.

8. A method according to claim 7, wherein the effect of the information supplied from a parallel decoder is eliminated from the reliability information before it is supplied to the other decoders.

9. Equipment for encoding and decoding a digital signal having a data sequence to be transmitted in a transmission channel, the equipment comprising:
   encoding means, including means for linear coding said digital signal to minimize transmission errors produced in the transmission channel, said encoding means comprising at least two parallel encoders, the input of which is the data sequence to be transmitted, for interleaving said data sequence such that the data is in a different order in each encoder, and each parallel encoder comprising:
   a group of registers which are combined with a cascade connection and to which the data sequence to be encoded is supplied, and
   a group of adding means the connections of which depend on a given generator polynomial, and which add the outputs of the registers to the data sequence to be encoded, and
   a mapping means the input of which consists of the outputs of the registers, and the output of which mapping means comprises a Walsh symbol or a complement thereof, and means for transmitting the output of said mapping means, decoding means for receiving said transmitted output of said mapping means, comprising at least two parallel decoders, the input of each parallel decoder consisting of the received Walsh symbol or a complement thereof and of reliability information about the mapping decision received from the other parallel decoders.

10. Equipment according to claim 9, wherein the data to be encoded is supplied to the input of the mapping means and further comprising means responsive to said data for determining whether the output of the mapping means comprises a Walsh symbol or a complement thereof.

11. Equipment according to claim 9, wherein said mapping means comprises converter means for selecting a Walsh symbol or a complement thereof on the basis of the inputs from said group of registers.

12. Equipment according to claim 9, wherein said mapping means comprises a Walsh-Hadamard generator.

* * * * *